US 7,340,909 B2

(12) United States Patent
Kwon et al.

(10) Patent No.: US 7,340,909 B2
(45) Date of Patent: Mar. 11, 2008

(54) CENTRAL CONTROL SYSTEM FOR MULTI-TYPE AIR CONDITIONERS AND OPERATING METHOD THEREOF

(75) Inventors: Jae Hwan Kwon, Seoul (KR); Sang Chul Youn, Kyungki-do (KR); Duck Gu Jeon, Seoul (KR); Jae Sik Jung, Seoul (KR); Young Soo Yoon, Seoul (KR); Jun Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 530 days.

(21) Appl. No.: 10/900,148

(22) Filed: Jul. 28, 2004

(65) Prior Publication Data
US 2005/0204758 A1  Sep. 22, 2005

(30) Foreign Application Priority Data
Mar. 22, 2004  (KR) ............... 10-2004-0019432

(51) Int. Cl.
G05D 23/00 (2006.01)
F25B 7/00 (2006.01)
G01M 1/38 (2006.01)
G05B 13/00 (2006.01)

(52) U.S. Cl. .................. 62/175; 236/51; 700/277; 700/278

(58) Field of Classification Search ............ 62/175, 62/126, 132; 236/51, 49.3; 700/277, 278, 700/276, 279
See application file for complete search history.

(56) References Cited
U.S. PATENT DOCUMENTS
7,082,353 B2 * 7/2006 Kwon et al. ............... 700/277

2002/0029096 A1 * 3/2002 Takai et al. ............... 700/276

FOREIGN PATENT DOCUMENTS
CN    1325204    12/2001

OTHER PUBLICATIONS
English language Abstract CN 1325204.

* cited by examiner

Primary Examiner—Chen Wen Jiang
(74) Attorney, Agent, or Firm—Greenblum & Bernstein, P.L.C.

(57) ABSTRACT

Disclosed are a central control system for multi-type air conditioners and an operating method thereof. In the central control system, multi-type air conditioners comprise a large number of indoor devices and a small number of outdoor devices, and a central controller is coupled to the multi-type air conditioners over a network. The central controller transmits a control graphic user interface (GUI) program provided therein to the remote control device so that an integrated control operation for respective air conditioners can be carried out. The central controller adjusts a transmission time of the control command signal received from the remote control device and transmits the control command signal to a corresponding air conditioner according to a result of the adjustment so that signal collision can be avoided. As the multi-type air conditioners installed within a building can be centrally controlled and efficiently managed, and control command signals from control devices coupled to the central controller over an internal/external network are transmitted to corresponding air conditioners, a control operation can be reliably performed.

13 Claims, 5 Drawing Sheets

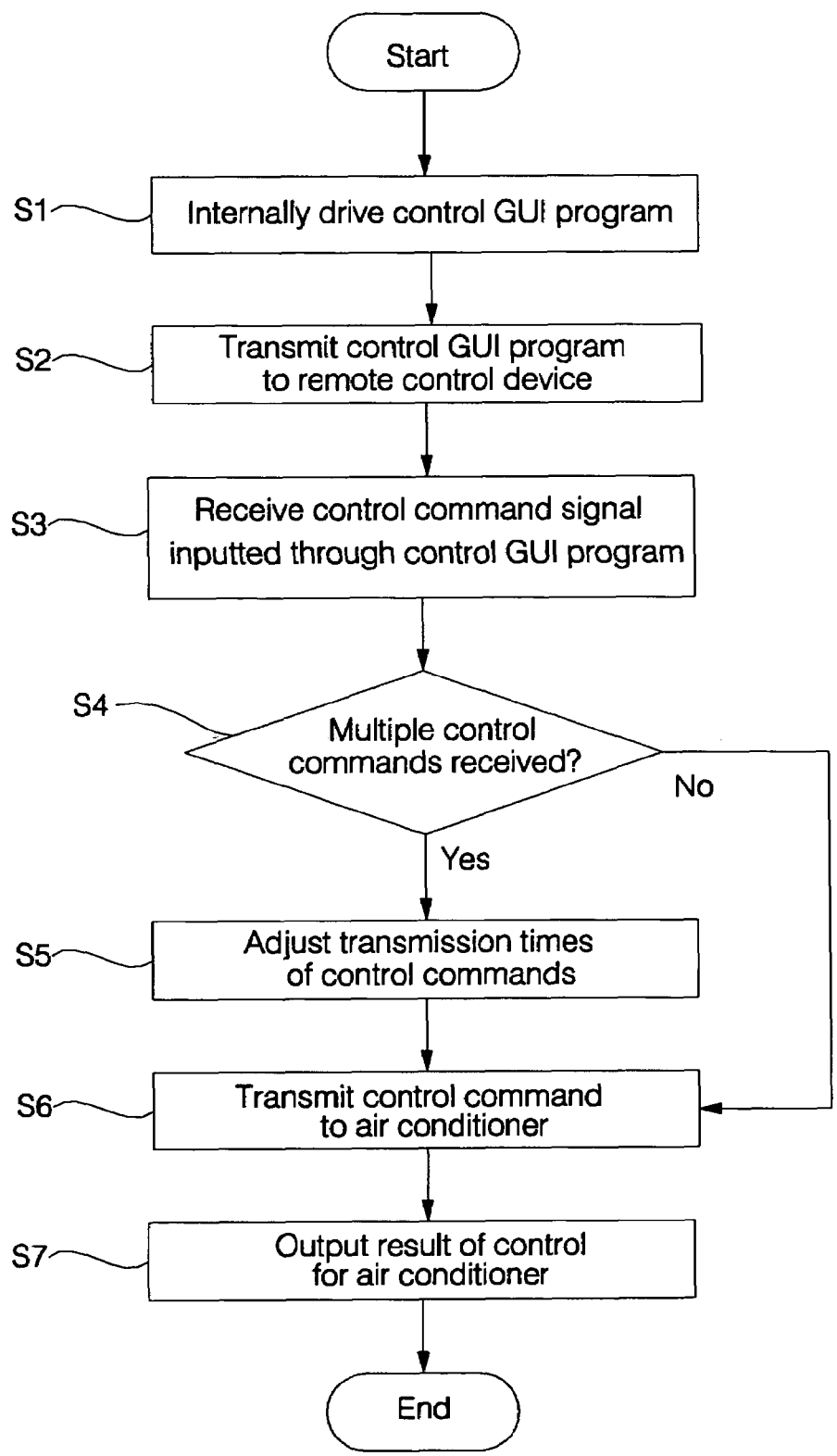

CENTRAL CONTROL SYSTEM FOR MULTI-TYPE AIR CONDITIONERS AND OPERATING METHOD THEREOF

BACKGROUND OF THE INVENTION

1. Field of the Invention

The present invention relates to a central control system for multi-type air conditioners and an operating method thereof, and more particularly to a central control system equipped with a central controller for multi-type air conditioners that can carry out an integrated control operation for the multi-type air conditioners that consists of a plurality of indoor devices and a single outdoor device, respectively, and can adjust signal transmission times so that control command signals simultaneously inputted from control devices coupled to the central controller over an internal/external network can be transmitted to corresponding air conditioners without signal collision, and an operating method of the central control system.

2. Description of the Related Art

A multi-type air conditioner consisting of a plurality of indoor devices disposed in respective rooms and a single outdoor device shared between the indoor devices is connected to a network. The multi-type air conditioner serves as an air conditioning system capable of reducing a space required for installing outdoor devices and improving the efficiency of energy use. It is preferable that the multi-type air conditioner is installed in a public building.

The multi-type air conditioner is connected to a central controller through which a control command for controlling an air conditioning operation can be inputted and a result of the control can be identified. A building manager operates the central controller to carry out an integrated control operation.

A system for multi-type air conditioners will be described in detail with reference to FIG. 1.

The system is configured by a large number of indoor devices 10 disposed in respective rooms and a small number of outdoor devices 20 shared between the indoor devices 10 for controlling coolant flow. One outdoor device 20 responsible for a plurality of indoor devices 10 controls coolant circulation. One outdoor device 20 is typically installed on each floor of a public building, and is connected to the plurality of indoor devices 10 disposed in respective rooms.

That is, the outdoor device 20 must recognize a control state of each indoor device to control coolant flow circulated in the plurality of indoor devices 10. Accordingly, when the manager inputs a cooling command into one indoor device, the outdoor device connected to the indoor devices must identify an indoor device receiving the cooling command, and a type of inputted cooling command, such that a coolant condensation operation is controlled and hence a cooling operation appropriate for the inputted cooling command can be performed.

However, if errors are detected from the indoor devices in the conventional system for multi-type air conditioners, the manager must access the outdoor device 20 connected to the indoor devices 10 to input a control command for repair and maintenance into the outdoor device 10 as shown in FIG. 1. Where a plurality of outdoor devices are installed on each floor within a large-sized building, there is a disadvantage in that manpower and cost for managing the outdoor devices increase significantly.

As a central controller (not shown) connected to the outdoor devices is recently installed to carry out a integrated control operation for the outdoor devices, the building manager can control the outdoor devices 20 and the indoor devices 10 connected to the outdoor devices 20 in a central control manner without accessing respective outdoor devices. However, because the central controller can only perform a function of a simple command input such as a power on/off command input, etc. and a simple identification function, there is a problem in that all details associated with the outdoor and indoor devices cannot be controlled.

Moreover, where the central controller is connected to an internal or external Internet network, a plurality of operators access the central controller using a control device inside/outside the building. As described above, the operation of a multi-type air conditioner can be controlled using the control device. However, where the operators simultaneously issue control commands, signal collision can be incurred between repeatedly received and transmitted control command signals, and hence the air conditioners cannot be reliably controlled.

SUMMARY OF THE INVENTION

Therefore, the present invention has been made in view of the above problems, and it is one object of the present invention to provide a convenient control environment in which a central controller can carry out an integrated control operation for multi-type air conditioners installed within a building and can transmit a control graphic user interface (GUI) program to at least one control device connected thereto over an internal or external network.

It is another object of the present invention to provide a central control system for multi-type air conditioners and an operating method thereof that can allow a central controller to adjust transmission times of control signals so that control commands inputted from respective control devices can be transmitted to corresponding air conditioners without signal collision, thereby reducing an erroneous control operation.

In accordance with one aspect of the present invention, the above and other objects can be accomplished by the provision of a central control system for multi-type air conditioners, comprising: multi-type air conditioners comprising a large number of indoor devices for air conditioning disposed in respective rooms and a small number of outdoor devices shared between the indoor devices for controlling coolant flow; at least one remote control device for transmitting a control command signal to monitor a state of each air conditioner or control an operation of each air conditioner inputted on a driven web browser over an external network, and outputting a result of the control received from each air conditioner; and a central controller for transmitting a control graphic user interface (GUI) program provided therein to the remote control device over the external network so that an integrated control operation for respective air conditioners can be carried out, and for adjusting a transmission time of the control command signal received from the remote control device and transmitting the control command signal to a corresponding air conditioner over an internal network according to a result of the adjustment.

In accordance with another aspect of the present invention, there is provided an operating method in a system equipped with multi-type air conditioners comprising a large number of indoor devices for air conditioning disposed in respective rooms and a small number of outdoor devices shared between the indoor devices for controlling coolant flow, and a central controller for controlling the multi-type air conditioners, the operating method comprising the steps of: (a) driving, by the central controller, a control graphic user interface (GUI) program through which a control command for monitoring a state of the multi-type air conditioners or controlling an operation of the multi-type air conditioners is inputted; (b) transmitting the control GUI program from the central controller over an Internet network so that the control GUI program can be driven on a web browser of at least one remote control device desiring to control the multi-type air conditioners; (c) receiving a control command signal through the control GUI program driven in the central controller or on the web browser of the remote control device; (d) when control command signals are simultaneously received, adjusting transmission times of the control command signals and transmitting the control command signals to a corresponding air conditioners according to a result of the adjustment without signal collision; and (e) receiving a signal indicating a result of the control from a controlled air conditioner in response to the control command signal and internally outputting the result of the control or outputting the signal indicating the result of the control to the remote control device.

The multi-type air conditioners serve as an air conditioning system comprising a large number of indoor devices disposed in respective rooms and a small number of outdoor devices shared between the indoor devices for controlling coolant flow.

A large number of indoor devices are coupled to a small number of outdoor devices located in a predetermined place within the building over a network. Each of the outdoor devices can manage control state variation of the indoor devices, and control coolant condensation to transfer the controlled condensed coolant to a corresponding indoor device.

The central controller carries out an integrated control operation for the multi-type air conditioners. The central controller is coupled to the air conditioners over an internal network based on RS-485, and is coupled to remote control devices over an external network based on transmission control protocol/Internet protocol (TCP/IP).

The remote control device indicates a terminal accessible in a wired/wireless fashion, and the type of remote control device is not limited. When accessing the central controller to control the operation of the multi-type air conditioners, a remote operator can input a control command and identify a result of the control, on the basis of the control GUI program transmitted from the central controller.

Thus, a manager of the multi-type air conditioners can perform an integrated control operation through the central controller, a remote control operation using the remote control device coupled to the external network and an internal control operation using an internal control device coupled to the internal network, such that the air conditioning operation can be efficiently managed within a building.

In this case, when a plurality of remote and internal control devices can simultaneously access the central controller, transmission times of simultaneously generated control signals can be adjusted and hence collision between the control signals and an erroneous operation can be avoided.

As a system configured by the multi-type air conditioners within the building can be centrally controlled and efficiently managed through the central controller in accordance with the present invention. In particular, the present invention can avoid collision between the control signals from the control devices, thereby reliably performing a control operation.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a flowchart illustrating an operation of the central control system for multi-type air conditioners in accordance with the present invention.

DESCRIPTION OF THE PREFERRED EMBODIMENTS

Now, a central control system for multi-type air conditioners and an operating method thereof in accordance with an embodiment of the present invention will be described in detail with reference to the annexed drawings.

The central control system for multi-type air conditioners and the operating method thereof can be implemented by a plurality of embodiments. Hereinafter, the best embodiment will be described. Because basic components of the inventive system are the same as the conventional components, the identical components will not be described in detail.

Figure 1:
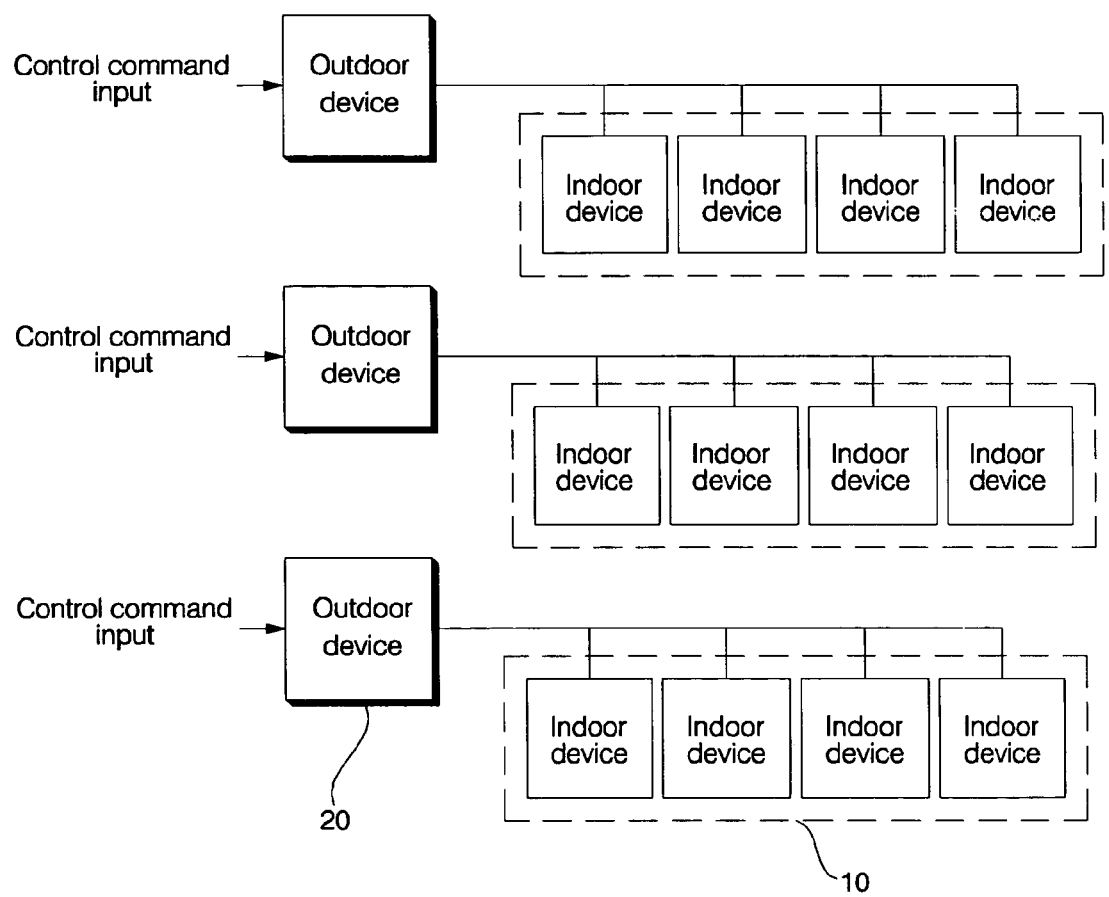
FIG. 1 is a block diagram illustrating a conventional system for controlling multi-type air conditioners.
Figure 2:
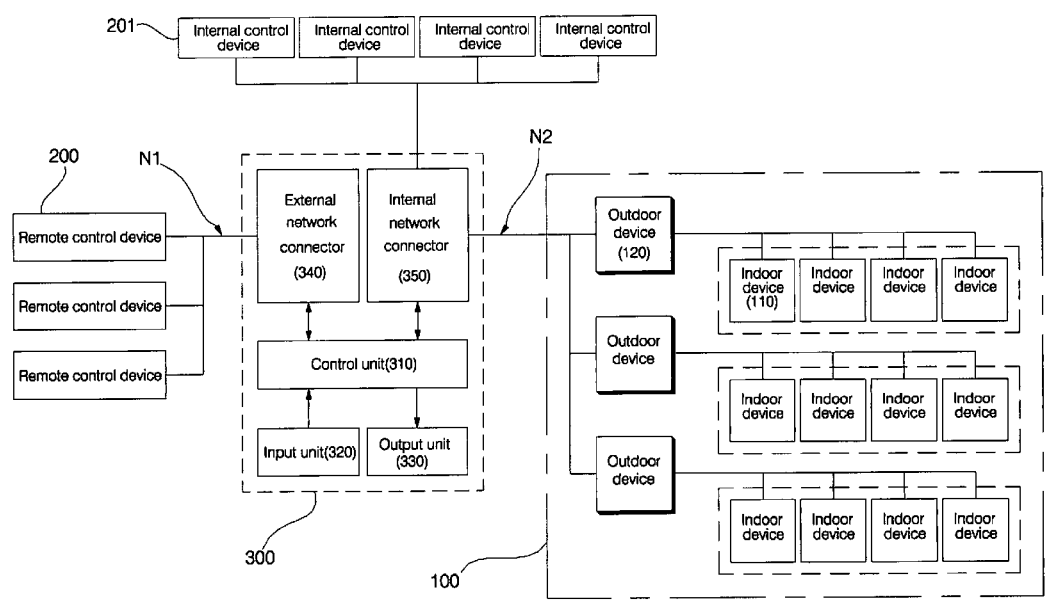
FIG. 2 is a schematic block diagram illustrating a central control system for multi-type air conditioners in accordance with the present invention.

FIG. 2 is a schematic block diagram illustrating a central control system for multi-type air conditioners in accordance with the present invention.

Multi-type air conditioners 100 serve as a system comprising a large number of indoor devices 110 disposed in respective rooms and a small number of outdoor devices 120 shared between the indoor devices 110 for controlling coolant flow. When the multi-type air conditioners 100 are installed, there are advantages in that the utility of an installation space is excellent and installation cost is reduced. Moreover, because one outdoor device connected to a plurality of indoor devices operates, power consumption is reduced and hence energy efficiency is excellent.

The outdoor device 120 includes a condenser for changing a coolant in a high-temperature and high-pressure gas state to a coolant in a liquid state. In the outdoor device 120, a compressor performs heat exchange with a gas coolant and outdoor air while the high-temperature and high-pressure gas coolant passes through the outdoor device, thereby forming a medium-temperature and high-pressure liquid coolant according to a condensation phenomenon. The outdoor device 120 includes an outdoor fan unit with an outdoor fan and a motor for ventilating air to the outdoor device 120 and increasing the efficiency of heat exchange.

If the medium-temperature and high-pressure liquid coolant is expanded by an expansion valve and hence a low-temperature and low-pressure liquid coolant passes through the indoor device 110, the liquid coolant absorbs heat from indoor air and is vaporized according to a vaporization phenomenon. At this time, a temperature of the indoor air is lowered, so that an indoor cooling operation is performed. Thus, the indoor device 110 includes an indoor fan unit with a motor and an indoor fan for ventilating hot or cool air indoors, etc.

A plurality of indoor devices 110 are installed in a designated place within a building. The indoor devices 110 are connected to the outdoor device 120 over a network. Therefore, the outdoor device 120 can manage control states of the indoor devices 110 connected thereto. The outdoor device 120 can control the coolant condensation and transfer the controlled condensed coolant to a corresponding indoor device 110.

The central controller 300 can carry out an integrated control operation for the multi-type air conditioners 100. The central controller 300 is coupled to the air conditioners over an internal network N2 based on RS-485, and is coupled to remote control devices 200 over an external network N1 based on transmission control protocol/Internet protocol (TCP/IP).

Here, RS-485 is a standard used for a multi-point communication line as a kind of a serial communication interface protocol. Transmission control protocol/Internet protocol (TCP/IP) is a standard used for a local area network (LAN) capable of exchanging information at a transmission rate of 10 Mbps between a maximum of 1,024 points within approximately 2.5 Km.

Figure 3:
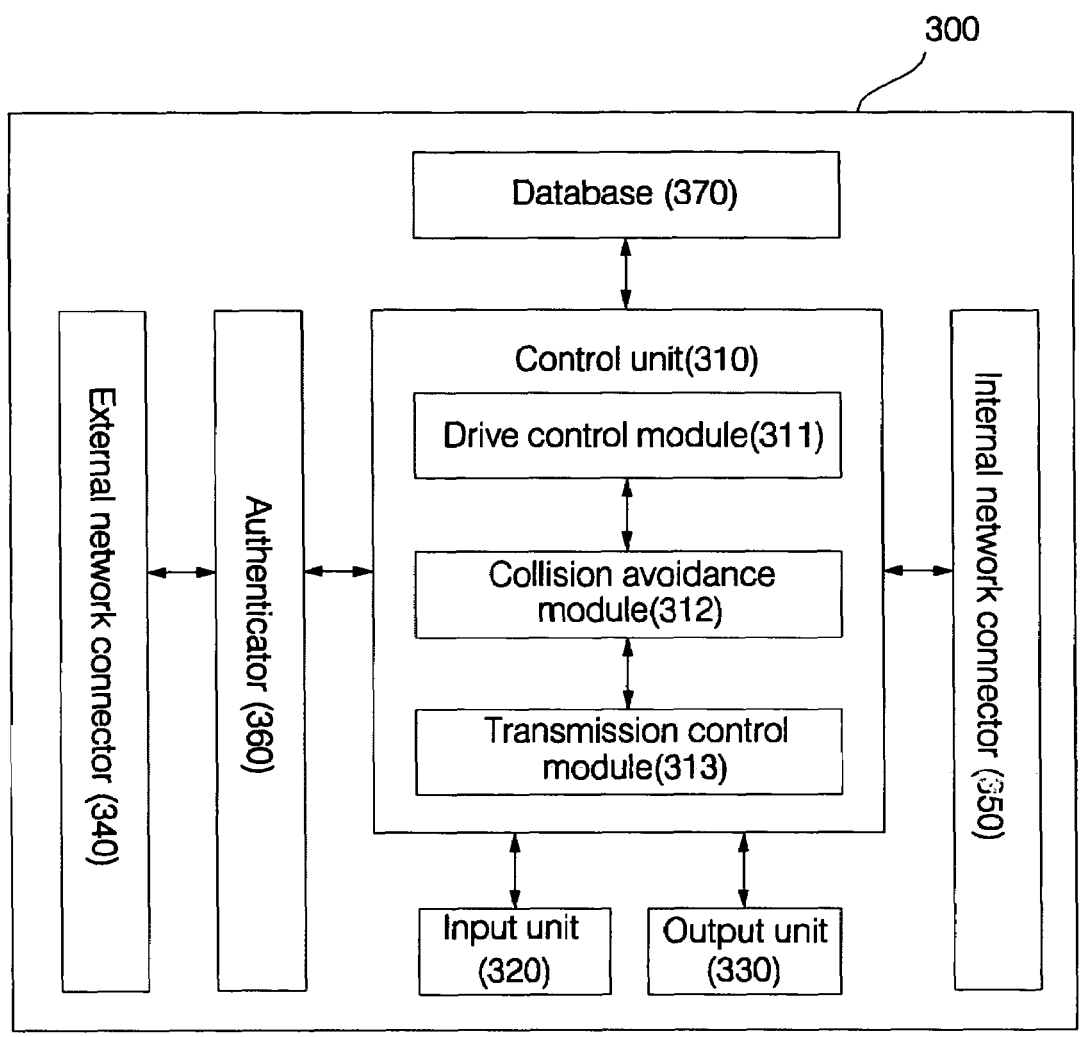
FIG. 3 is a block diagram illustrating a central controller for multi-type air conditioners in accordance with the present invention.

As shown in FIG. 2, the central controller 300 can be coupled to a plurality of remote control devices 200 over the external network N1, and can be coupled to a plurality of internal control devices 201 over the internal network N2. Each remote control device 200 and the central controller 300 will be described in detail with reference to FIGS. 3 and 4. FIG. 3 is a block diagram illustrating a central controller for multi-type air conditioners in accordance with the present invention, and FIG. 4 is a block diagram illustrating a remote control device in accordance with the present invention.

The central controller 300 comprises an internal network connector 350 connected to the outdoor devices 120 and an external network connector 340 connected to the remote control devices 200 capable of remotely controlling an operation of multi-type air conditioners. A manager centrally controls the plurality of outdoor devices 120 using the central controller 300 to control the operation of the indoor device 110 installed in each room. A remote operator also can access the central controller 300 and control the operation of the multi-type air conditioners 100.

It is preferable that the internal network connector 350 is implemented by a power line communication module for transmitting and receiving a signal over a power line communication network or a Bluetooth communication module for transmitting and receiving a signal on the basis of a Bluetooth communication protocol. A different module can be employed according to a type of network used.

Figure 4:
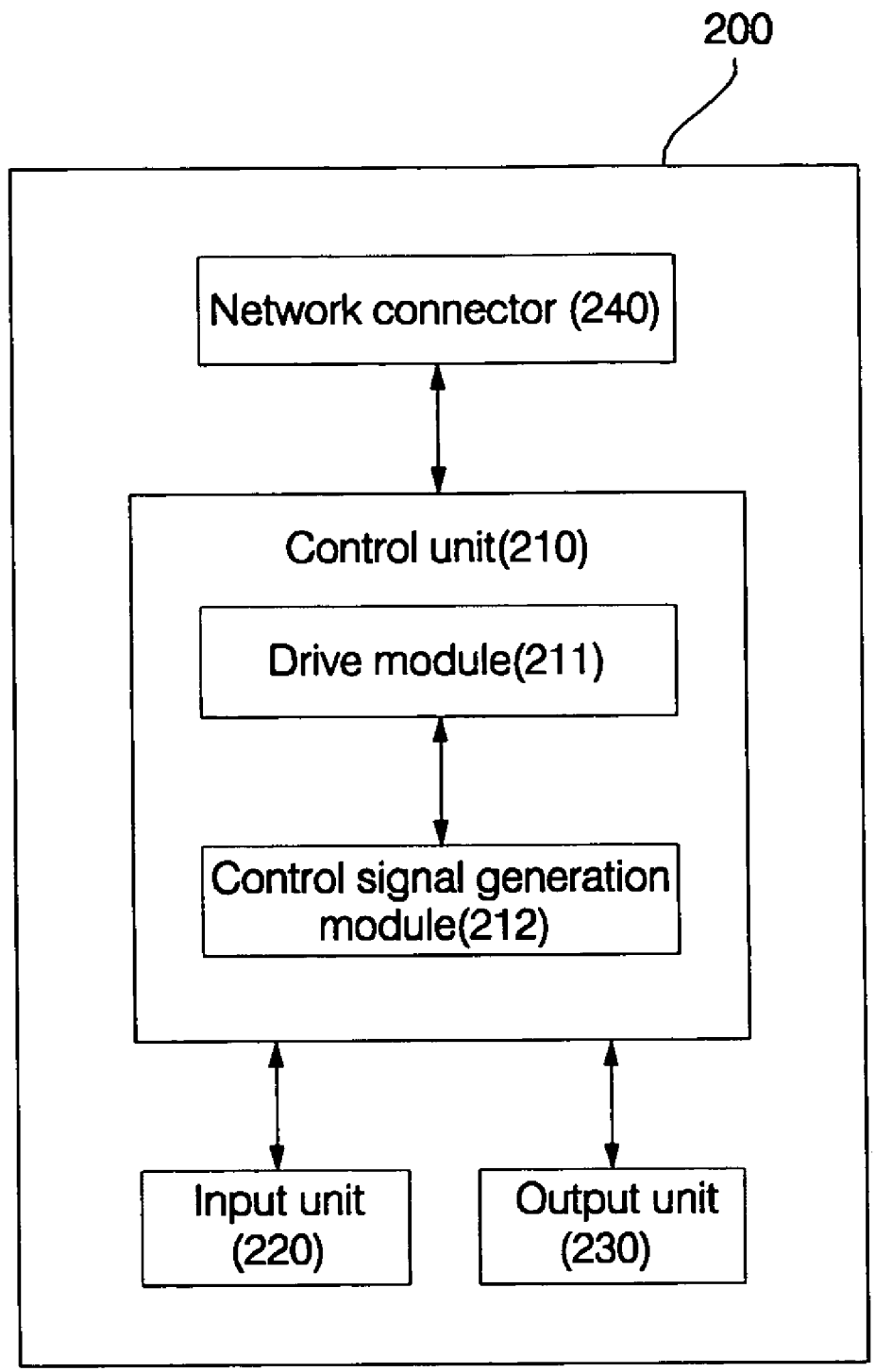
FIG. 4 is a block diagram illustrating a remote control device in accordance with the present invention.

As shown in FIG. 4, the remote control device 200 is a device capable of remotely accessing the external network (e.g., an Internet network) in a wired/wireless fashion. The remote control device 200 accesses the central controller 300 and inputs a control command signal to control the multi-type air conditioners 100. At this point, the remote control device 200 accesses the central controller 300 over IP.

The remote control device 200 comprises a network connector 240 for receiving a control graphic user interface (GUI) program from the central controller 300, an input unit 220 for receiving a control command to control the operation of the multi-type air conditioners 100, an output unit 230 for outputting a result of the control and a control unit 210 for generating a control signal according to the control command inputted from the input unit 220 and driving the control GUI program on a web page.

As the remote control device 200 coupled to the central controller 300 acquires right to control the air conditioners and the control GUI program is automatically executed on the web page, the remote control device 200 can input a control command for monitoring a state of the multi-type air conditioners and controlling an operation of the multi-type air conditioners, and can identify a result of the control through the control GUI program. The central controller 300 is equipped with an authenticator 360 for authenticating the remote control device 200.

The above-described control program is conveniently executed without use of special installation, and is the same as a control program driven in the central controller 300.

The central controller 300 comprises an internal network connector 350 capable of exchanging a signal with the multi-type air conditioners 100 over the internal network N2; an external network connector 340 capable of exchanging a signal with the remote control devices 200 coupled to the external network N1 in the wired/wireless fashion; an input unit 320 receiving a control command over the control GUI program; and an output unit 330 outputting a result of the control of an air conditioner.

The central controller 300 comprises a control unit 310 for transmitting the control GUI program to the one or more remote control devices 200 coupled thereto and for relaying inputted signals to corresponding air conditioners without collision between internal and remote control command signals so that the corresponding air conditioners can be controlled. In this case, the central controller 300 authenticates the remote control devices 200 to allow the remote control device 200 to access the central controller 300.

That is, the central control system for multi-type air conditioners performs an individual control operation through the indoor device 110 disposed in each room, an integrated control operation using the control GUI program driven in the central controller 300, a control operation based on the internal control device 201 coupled to the central controller 300 over the internal network, and a control operation based on the remote control device 200 coupled to the central controller 300 over the external network as shown in FIG. 2.

The control unit 310 provided in the central controller 300 comprises a drive control module 311 for internally driving the control GUI program so that the integrated control operation for the multi-type air conditioners 100 can be carried out, a transmission control module 313 for transmitting the control GUI program so that the one or more authenticated remote control devices 200 coupled to the external network N1 can drive the control GUI program on a web browser thereof, and a collision avoidance module 312 for adjusting a transmission time so that control command signals simultaneously inputted from the remote control devices can be transmitted to the multi-type air conditioners 100 without signal collision.

The collision avoidance module 312 comprises a buffer for temporarily buffering the control command signals simultaneously received from the remote control devices.

When the drive control module 311 operates and the control, GUI program is driven, the manager can perform an integrated control operation by inputting a control command through the input unit 320.

When the authenticated remote control device 200 is coupled to the central controller 300, the transmission control module 313 automatically transmits the control GUI program to the remote control device 200. Thus, the same GUI environment as in the central controller 300 is implemented in the remote control device 200. A remote manager or operator can control the operation of the multi-type air conditioners 100 on the web browser without installing a special program.

Thus, the control command signal inputted from the remote control device 200 is transmitted to the central controller 300 according to a preset protocol, and the central controller 300 processes the received control command signal to transmit the processed signal to a corresponding air conditioner. Furthermore, the central controller 300 receives a signal indicating a result of the control from the corresponding air conditioner and transmits the received signal to the remote control device 200.

When the one or more remote control devices 200 access the central controller 300 and download the control GUI program from the central controller 300 as shown in FIG. 2, the same control GUI environment is provided in the respective remote control devices 200 as if a plurality of central controllers operate.

Upon simultaneously receiving the control commands from the remote control device 200 and the internal control device 201, the collision avoidance module 313 provided in the central controller 300 executes an artificial intelligence algorithm and avoids signal collision by transmitting the control commands to corresponding air conditioners at different times.

This is applied to the case where control result signals received from the corresponding air conditioners are transmitted to the remote control devices 200, such that the central control system for multi-type air conditioners can be stably operated.

The input unit 320 and the output unit 330 provided in the central controller 300 can be integrated using a touch screen panel, such that convenience of input manipulation can be improved.

Furthermore, the central controller 300 comprises a database 370 storing setting information associated with a plurality of indoor devices/outdoor devices coupled to the network, network connection information, installation region information and authentication information of the remote control devices.

An operating method of the system for multi-type air conditioners constituted as described above will be described with reference to FIG. 4. First, at the first step, the control GUI program is driven inside the central controller so that a control command for monitoring a state of the multi-type air conditioners or controlling an operation of the multi-type air conditioners can be inputted (S1).

At the second step, when the remote control device desiring to control the multi-type air conditioners accesses the central controller over the Internet network, the central controller transmits the control GUI program to the remote control device so that the remote control device can execute the control GUI program on its web browser (S2).

Before transmitting the control GUI program, the central controller authenticates the remote control device to give control right thereto.

At the third step, a control command signal is received through the control GUI program driven inside the central controller or driven on the web browser of the remote control device (S3).

At the fourth step, a determination is made as to whether or not the central controller has received a plurality of control commands simultaneously inputted at the third step (S4).

When receiving the plurality of control commands simultaneously inputted, the central controller adjusts transmission times for the control commands (S5) and transmits the control commands to corresponding air conditioners (S6). Thus, when a plurality of control commands are received from a plurality of remote control devices, collision between the control commands can be avoided.

At the fifth step, upon receiving a signal indicating a result of the control from the air conditioner controlled according to the control command, the central controller outputs the result of the control or transmits the signal indicating the result of the control to the remote control device (S7).

As apparent from the above description, a central control system for multi-type air conditioners and an operating method thereof that can control an operation of multi-type air conditioners using at least one control device coupled to a central controller over an internal/external network, thereby extending a range of control.

Moreover, as a control device can receive a control graphic user interface (GUI) program capable of being driven on its web browser without installing a special control program, a state of an air conditioner can be monitored and an operation of the air conditioner can be controlled and hence convenience of control can be increased.

Moreover, when a plurality of control devices are coupled to the central controller over the internal/external network, signal transmission times can be automatically adjusted so that simultaneously issued control commands do not collide with each other, such that an erroneous operation of the multi-type air conditioners is reduced and hence a stable system can be implemented.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A central control system for multi-type air conditioners, comprising:
    multi-type air conditioners comprising a large number of indoor devices for air conditioning disposed in respective rooms and a small number of outdoor devices shared between the indoor devices for controlling coolant flow;
    at least one remote control device for transmitting a control command signal over an external network to monitor a state of each air conditioner or control an operation of each air conditioner inputted on a driven web browser, and outputting a result of the control received from each air conditioner; and
    a central controller for transmitting a control graphic user interface (GUI) program provided therein to the remote control device over the external network so that an integrated control operation for respective air conditioners can be carried out, and for adjusting a transmission time of the control command signal received from the remote control device and transmitting the control command signal to a corresponding air conditioner over an internal network according to a result of the adjustment.

2. The central control system according to claim 1, wherein the central controller is coupled to at least one internal control device for controlling an operation of the multi-type air conditioners and monitoring a state of the multi-type air conditioners over the internal network.

3. The central control system according to claim 1, wherein the central controller comprises:

an internal network connector for exchanging a signal with the multi-type air conditioners over the internal network;

an external network connector for exchanging a signal with the remote control device coupled to the external network in a wired/wireless fashion;

an input unit for receiving a control command over the control GUI program;

an output unit for outputting a result of the control; and a control unit for transmitting the control GUI program to the remote control device coupled thereto and for relaying inputted signals to corresponding air conditioners without collision between internally inputted control command signals or control command signals received over the internal and external networks so that the corresponding air conditioners can be controlled.

4. The central control system according to claim 3, wherein the control unit comprises:

a drive control module for internally driving the control GUI program so that the integrated control operation for the multi-type air conditioners can be carried out;

a transmission control module for transmitting the control GUI program so that at least one authenticated remote control device coupled to the external network can drive the control GUI program on a web browser thereof; and a collision avoidance module for adjusting signal transmission times so that control command signals can be transmitted to corresponding air conditioners without signal collision when the control command signals are simultaneously received from remote control devices.

5. The central control system according to claim 4, wherein the collision avoidance module comprises:

a buffer for temporarily buffering the control command signals simultaneously received from the remote control devices.

6. The central control system according to claim 3, wherein the central controller further comprises:

an authenticator for authenticating the remote control device to give control right thereto.

7. The central control system according to claim 3, wherein the internal network connector is a power line communication module for transmitting and receiving a signal over a power line communication network.

8. The central control system according to claim 3, wherein the internal network connector is a Bluetooth communication module based on a Bluetooth communication protocol for transmitting and receiving a signal.

9. The central control system according to claim 3, wherein the central controller further comprises:

a database for storing setting information of the multi-type air conditioners, network connection information, installation region information and authentication information of the remote control device.

10. The central control system according to claim 1, wherein the remote control device comprises:

a network connector for receiving the control GUI program from the central controller;

an input unit for receiving a control command for controlling the operation of the multi-type air conditioners;

an output unit for outputting a result of the control for the multi-type air conditioners and an operating state of the multi-type air conditioners; and a control unit for generating a control signal according to a control command inputted from the input unit and driving the control GUI program on a web page.

11. The central control system according to claim 10, wherein the control unit comprises:

a control signal generation module for generating the control signal in response to the control command inputted from the input unit; and a drive module for driving the control GUI program received from the central controller on the web browser.

12. An operating method in a system equipped with multi-type air conditioners comprising a large number of indoor devices for air conditioning disposed in respective rooms and a small number of outdoor devices shared between the indoor devices for controlling coolant flow, and a central controller for controlling the multi-type air conditioners, the operating method comprising:

driving, by the central controller, a control graphic user interface (GUI) program through which a control command for monitoring a state of the multi-type air conditioners or controlling an operation of the multi-type air conditioners is inputted;

transmitting the control GUI program from the central controller over an Internet network so that the control GUI program can be driven on a web browser of at least one remote control device desiring to control the multi-type air conditioners;

receiving a control command signal through the control GUI program driven in the central controller or on the web browser of the remote control device;

when control command signals are simultaneously received, adjusting transmission times of the control command signals and transmitting the control command signals to a corresponding air conditioners according to a result of the adjustment without signal collision; and receiving a signal indicating a result of the control from a controlled air conditioner in response to the control command signal and internally outputting the result of the control or outputting the signal indicating the result of the control to the remote control device.

13. The operating method according to claim 12, wherein the transmitting comprises:

authenticating the remote control device to give control right thereto.

* * * * *